(No Model.)
C. H. FISHER.
SPINNING SPINDLE AND SUPPORT THEREFOR.
No. 356,356. Patented Jan. 18, 1887.
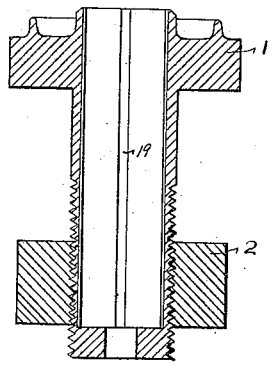
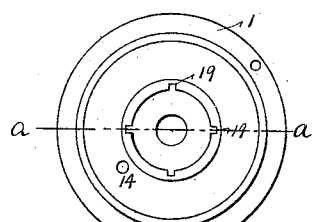
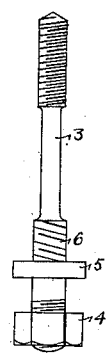
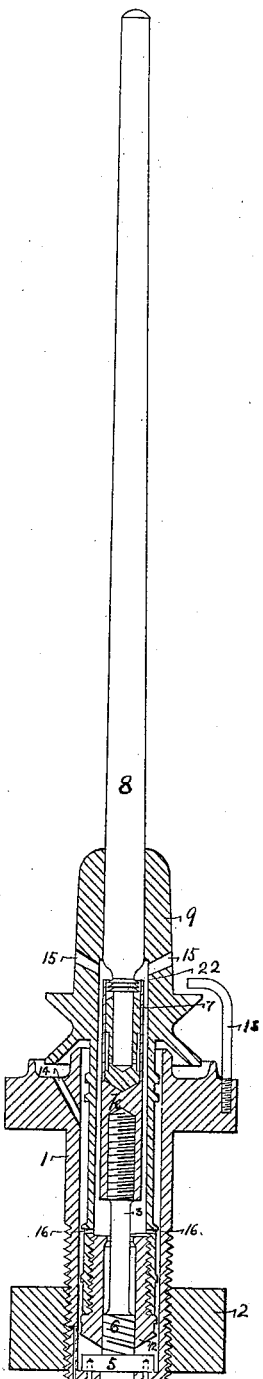
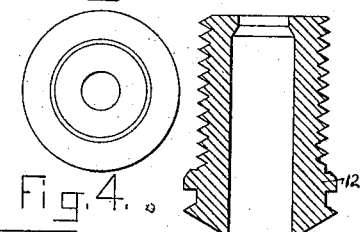
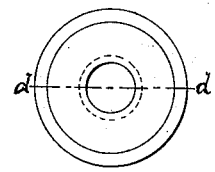
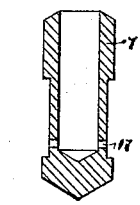
Fig. 2. Fig. 3. Fig. 1. Fig. 4. Fig. 5. Fig. 6. Fig. 7.
WITNESSES:
G. A. Nelson
Melvin B. Smith
INVENTOR:
Charles H. Fisher

UNITED STATES PATENT OFFICE.

CHARLES HENRY FISHER, OF LOWELL, MASSACHUSETTS.

SPINNING-SPINDLE AND SUPPORT THEREFOR.

SPECIFICATION forming part of Letters Patent No. 356,356, dated January 18, 1887.

Application filed July 1, 1886. Serial No. 206,758. (No model.)

*To all whom it may concern:*

Be it known that I, CHARLES HENRY FISHER, a citizen of the United States, residing at Lowell, in the county of Middlesex and State of Massachusetts, have invented a new and useful Improvement in Spinning-Spindles and Supports Therefor, of which the following is a specification.

My invention relates to that class of spindles which are commonly used in ring-spinning machines; and its object is to reduce the amount of power required to drive such spindles and the amount of oil that is required to lubricate them.

My invention is illustrated in the accompanying drawings, in which—

Figure 1 is an elevation, partly in section, of a spinning-spindle and its support ready to be clamped to the proper rail of a spinning-frame in the usual manner. Fig. 2 is a plan and a section at the line $a\ a$ of the main supporting-tube, with its clamping-nut as I prefer to make it. Fig. 3 is a detached elevation of the step-supporting standard. Fig. 4 is a plan and an elevation of the whirl and spindle guiding-sleeve. Fig. 5 is an enlarged plan and section at the line $b\ b$ of the step-case. Fig. 6 is an enlarged plan and a section at the line $c\ c$ of the step, and Fig. 7 is an enlarged plan and a section at the line $d\ d$ of the lower spindle-bearing as I prefer to make it.

Similar reference-numbers refer to similar parts throughout the several views.

In the drawings the spindle is shown as being supported in the main supporting-tube, 1, that is provided with the usual clamping-nut, 2. This tube has a central hole in its bottom, in which is supported the step-supporting standard 3, which is held firmly therein by the nut 4, or other suitable means, it being prevented from passing entirely through the said hole by the collar 5. I prefer to make the projection 6 upon the bottom of the shank of the step-supporting standard and to cut a shallow spiral groove therein, as shown in the drawings, although these constructions may be omitted without rendering the standard inoperative.

Upon the top of the standard 3 is fastened, by means of a screw or other suitable means, the step-case $k$, in which the step 7 is held and prevented from turning by being tightly driven therein, or by other equivalent means. Resting in the step 7 is the spindle 8, which is provided with the whirl and spindle guiding sleeve 9. This sleeve is preferably provided with several projections, 10 and 11, upon its exterior surface, which serve to gather any oil which may accidentally get upon the exterior surface of the sleeve, and carry it outward, when nearly all of the oil will come in contact with the grooves 19 of the main supporting-tube and run down to the bottom of the said tube. These projections are made slightly smaller than the interior of the main supporting-tube, since it is not desired that they shall come in contact therewith when the spindle is in operation.

It will be noted that the spindle 8 is provided with similar projections, 22, which serve a similar purpose in the case of the bearing in the step 7, thus preventing the escape of oil therefrom. In the lower end of the sleeve 9 is a bearing, 12, which works upon the surface of the projection 6, and thus causes the spindle 8 to be held in its proper position. I prefer to make this bearing as shown in the drawings and to screw it into the lower end of the sleeve 9, although I am aware that other and equivalent means of maintaining this bearing in connection with the upper part of the sleeve may be employed, one of which is to make the said bearing an inseparable part of the sleeve.

The spindle is prevented from rising by the bent wire 13, in the usual way. Oil may be supplied to the lower bearing, 12, when necessary, through the oil-hole 14, and to the step 7 through holes 15, left for the purpose in the whirl.

It is not intended that there shall be an excess of oil in any part of the apparatus, and consequently I prefer to provide the safety-holes 16, 20, and 21, in order to allow of its escape from the space in the sleeve above the top of the bearing, the step-case, and the main supporting-tube, as shown, although these holes are not necessary to the successful working of the spindle.

In order to allow of a proper movement of the oil in the step-case, I prefer to make the step, as shown, with a groove surrounding it and holes 17 leading from the said groove to the interior of the step. Grooves 18, between the outer part of the step and the step-case, allow oil to freely fill the groove surrounding the step, and to reach the interior thereof through the holes 17.

I have found that it is desirable to lead the holes 17 into the interior of the step at or near the lower part thereof, in order that the said lower part may be thoroughly oiled, since I find that the oil has a tendency to rise in the step and leave the lower portion thereof dry, unless fresh oil is supplied at that point. The groove which surrounds the step serves as an oil-reservoir as well as a connection between the grooves 18 and the holes 17. It is evident that the grooves 18 and the said oil-reservoir may be equivalently made either in the outer surface of the step or in the casing, although I think it slightly preferable to make the grooves 18 in the casing and the oil-reservoir, as shown in the drawings, in the outer surface of the step. By forming the oil-chamber as shown I am able to correctly align and firmly hold the step in its casing by means of the double bearing thus formed thereon, while leaving a very considerable space to retain oil.

I prefer to make the lower bearing, 12, as shown, with an oil-chamber above the projection 6 upon the standard 3, and to contract the upper opening into the said chamber as much as possible, as shown. I also think it is desirable to taper the interior of the sleeve 9, having the largest diameter of the same at the lower end, as shown in Fig. 1.

The operation of this spindle is as follows: Oil is placed in the step-case and in the main supporting-tube until they are sufficiently supplied, and the spindle is then started. Oil is prevented from working upward upon the spindle from the step 7 by the projections 22 upon the spindle, which return any oil which begins to rise up the spindle back to the lower part of the step 7 through the grooves 18. These oil-returning grooves may be of any suitable form, two shapes of this kind of groove being shown in Figs. 2 and 5. The oil in the main supporting-tube will have a tendency to rise up and partially fill the oil-chamber in the bearing 12 above the projection 6, carried there by the grooves upon the projection 6 and by centrifugal force. By this means the level of the oil in the main supporting-tube is intended to be reduced to or below the bottom of the bearing 12, it being proper to place the safety-outlet 21 in such a position that this will happen before the said oil-chamber is entirely full, thus preventing the escape of the oil upward into the interior of the sleeve 9. By these means both the upper and the lower bearings of the spindle will always be flooded as long as enough oil is in the step-casing and the main supporting-tube, while there will be no violent churning of the oil, and but little oil in contact with any of the rotating parts where it is not needed.

In order that the much-desired gyrating motion of the spindle may be provided for, I prefer, according to the principles of the science of mechanics, to make the shank of the standard 3 of such a size and length that it may spring appreciably when a moderate side pull is exerted upon the spindle, but not enough to interfere with the proper working of the spindle. To prevent injury to this shank, which will usually be slender, I make the hole in the main supporting-tube of such a diameter that it will prevent an injurious deflection of this shank as long as the other parts of the spindle are uninjured, no matter how improperly it may be used by carelessness in doffing and banding.

I prefer to place the plane of the band-groove in such a position that it shall cross the journal in the step 7 at or near the middle of the step, as shown, although I am aware that other situations for this plane may be chosen, though less advantageously.

I am also aware that spindles with a much more rigid step-supporting standard than those hereinbefore described are substantially better than earlier forms if other improved features, as herein described, are incorporated therein.

I do not limit myself to supporting the spindle-supporting standard exactly as shown, since I am aware that other equivalent methods may be used instead.

When such rigid supporting-standard is used, it is neither necessary nor desirable to make the hollow in the main spindle-support 1 so deep as is desirable when a flexible standard is used, since the hollow in the main spindle-support need then to be only deep enough to hold the requisite supply of oil.

The spindle illustrated in the drawings is so arranged that a bobbin may be used therewith which fits wholly upon the blade of the spindle, or, as I prefer, one which is supported partly by the blade of the spindle and projects downwardly and surrounds a greater or less portion of the sleeve 9. A bobbin supported wholly by the sleeve 9 may even be used, when it is desirable to do so, when the parts of the spindle are properly proportioned for that purpose. The length of the sleeve 9 above the whirl, the length of the spindle above the sleeve 9, and the length of the sleeve 9 below the whirl, as well as other proportions of the parts, may all be varied in any desirable manner, according to the kind of work which is to be done by the spindle.

I am aware that some of the improvements described and claimed in this specification may be advantageously used with forms of spindles which are in other respects substantially different from that shown in the drawings, and that the step 7 may sometimes form a part of the casing $k$, if it be desired to so make it, and the said combined step and casing be made as an inseparable part of the spindle-supporting standard.

I prefer that the fit of the lower sleeve-bearing upon the outside of the step-supporting standard may be a rather loose one, this bearing being merely for safety, since I desire the spindle to be mostly supported and guided by that part of the spindle which is within the step 7, and sometimes entirely so. In the latter case the lower sleeve-bearing need not come in contact with the step-supporting, standard during the ordinary use of the spindle.

What I claim as new, and desire to secure by Letters Patent, is—

1. A step-supporting casing, and a spindle-step held and aligned within the said supporting-casing by more than one bearing, said casing and step having an oil-chamber surrounding the said step and within the said casing, as shown, oil-conduits leading from the space within the said casing and above the said step to the said oil-chamber, and oil-conduits leading from the said oil-chamber to the lower part of the bearing in the step, combined with a spindle resting within the said step and provided with oil-retaining projections surrounded by a portion of the said step-casing, substantially as set forth.

2. The spinning structure which consists of a main supporting-tube that is provided with interior grooves, 19, a spindle-supporting standard which is supported by the said tube, a spindle with a whirl and guiding-sleeve attached thereto, the sleeve projecting into the supporting-tube and provided with projections upon its exterior surface, which are slightly smaller than the interior diameter of the said supporting-tube, substantially as set forth.

3. The spinning structure which consists of a main spindle-support, a flexible spindle-supporting standard and a spindle supported thereby, a whirl attached to the said spindle, a sleeve projecting downwardly from the said whirl and bearing at its base upon the said flexible standard, and means of preventing an injurious deflection of the standard, substantially as described, and for the purposes set forth.

4. The spinning structure which consists of a main spindle-support, a spindle-supporting standard provided with a projection, 6, a spindle supported by the said standard, a whirl attached to the said spindle, a sleeve attached to the said whirl and which is provided with a bearing at its base that surrounds the projection 6, and is furnished with an oil-chamber extending above the said projection and having a contracted top, substantially as set forth.

5. The spinning structure which consists of a main spindle-support, a spindle-supporting standard and a spindle supported thereby, a whirl having a band-groove whose plane crosses the bearing of the said spindle that is within the top of the said standard, a sleeve projecting downwardly from the said whirl and encompassing the said standard, as set forth.

6. The spinning structure which consists of a main supporting-tube provided with oil-grooves 19 in its interior surface, a flexible step-supporting standard with an enlarged bearing thereon, a step-case supported upon the said standard, a step supported in the said step-case, said step and case having an oil-chamber surrounding the said step and within the said case, and conduits leading from the said oil-chamber to the space above the said step within the said case and to the bearing within the said step, a spindle resting in said step and provided with oil-retaining projections surrounded by a portion of the said step-case, a whirl attached to the said spindle, a guiding-sleeve attached to the said whirl and provided at its base with a bearing that has a contracted top and that surrounds the enlarged bearing upon the said step-supporting standard, substantially as described.

7. The spinning structure which consists of a main spindle-support, a step-supporting standard, a step-case supported by the said standard and provided with the safety-hole 20, a step supported in the step-case, a spindle resting in the said step, a whirl attached to the said spindle, a guiding-sleeve attached to the said whirl and surrounding at its base the said step supporting standard, and provided above its bearing upon the said standard with an oil-chamber having a contracted top, and with the safety-hole 16 above the said oil-chamber, substantially as set forth.

CHARLES HENRY FISHER.

Witnesses:
HARRY A. BROWN,
GEORGE W. POORE.